US012381587B2

(12) United States Patent
Notari et al.

(10) Patent No.: US 12,381,587 B2
(45) Date of Patent: Aug. 5, 2025

(54) MILLIMITER-WAVE ANTENNA SYSTEM FOR RADIOMOBILE COMMUNICATIONS IN VEHICLES

(71) Applicant: ASK INDUSTRIES SOCIETA' PER AZIONI, Monte San Vito (IT)

(72) Inventors: Andrea Notari, Viano (IT); Riccardo Maggiora, San Salvatore Monferrato (IT); Fabio Casoli, Reggio Emilia (IT); Tiziano Nili, Reggio Emilia (IT)

( * ) Notice: Subject to any disclaimer, the term of this patent is extended or adjusted under 35 U.S.C. 154(b) by 393 days.

(21) Appl. No.: 18/004,324

(22) PCT Filed: Aug. 3, 2021

(86) PCT No.: PCT/EP2021/071642
§ 371 (c)(1),
(2) Date: Jan. 5, 2023

(87) PCT Pub. No.: WO2022/033922
PCT Pub. Date: Feb. 17, 2022

(65) Prior Publication Data
US 2023/0253997 A1   Aug. 10, 2023

(30) Foreign Application Priority Data
Aug. 10, 2020   (IT) .................. 102020000019876

(51) Int. Cl.
*H04B 1/08*   (2006.01)
*H01Q 1/32*   (2006.01)
(Continued)

(52) U.S. Cl.
CPC ........... *H04B 1/082* (2013.01); *H01Q 1/3275* (2013.01); *H01Q 1/3283* (2013.01); *H01Q 21/28* (2013.01);
(Continued)

(58) Field of Classification Search
CPC .... H04B 1/082; H04B 1/0096; H04B 1/3822; H04B 7/0617; H01Q 1/3275;
(Continued)

(56) References Cited

U.S. PATENT DOCUMENTS 5,767,793 A   6/1998   Agravante et al.
6,034,641 A   3/2000   Kudoh et al.
(Continued)

FOREIGN PATENT DOCUMENTS

DE   19848360 A1   4/2000
WO   2019156468 A1   8/2019

OTHER PUBLICATIONS

International Search Report for corresponding PCT/EP2021/071642 dated Oct. 26, 2021.
(Continued)

*Primary Examiner* — Kenneth T Lam
(74) *Attorney, Agent, or Firm* — Egbert, McDaniel & Swartz, PLLC

(57) ABSTRACT

An antenna system for radio mobile communications in vehicles having at least one remote antenna module connected with a cable to a central control unit; the remote antenna module having: a plurality of radiant elements, an RF front end and a control interface; the central control unit having: a signal processor, and a control interface; the control interface of the remote antenna module and the control interface of the central control unit are suitably configured for transmitting the input/output data signals and the control signals over the cable in order to control the control interface and the RF front end of the remote antenna module.

10 Claims, 13 Drawing Sheets

(51) Int. Cl.
*H01Q 21/28* (2006.01)
*H04B 1/00* (2006.01)
*H04B 1/3822* (2015.01)
*H04B 7/06* (2006.01)

(52) U.S. Cl.
CPC ......... *H04B 1/0096* (2013.01); *H04B 1/3822* (2013.01); *H04B 7/0617* (2013.01)

(58) Field of Classification Search
CPC ........ H01Q 1/3283; H01Q 21/28; H01Q 3/30; H01Q 1/241; H01Q 1/3208; H01Q 1/3266
See application file for complete search history.

(56) References Cited

U.S. PATENT DOCUMENTS

| | | | |
|---|---|---|---|
| 2006/0172712 A1* | 8/2006 | Sievenpiper | H04B 7/0814 |
| | | | 455/101 |
| 2018/0269915 A1* | 9/2018 | Spehl | H04B 7/0615 |
| 2018/0288763 A1* | 10/2018 | Sai | H01Q 3/24 |
| 2019/0097662 A1* | 3/2019 | Hornbuckle | H04B 1/10 |
| 2019/0393883 A1 | 12/2019 | Houser | |
| 2020/0044314 A1 | 2/2020 | Xia et al. | |
| 2020/0212943 A1* | 7/2020 | Banin | H04B 1/04 |
| 2022/0216980 A1* | 7/2022 | Gao | H04L 7/033 |
| 2023/0140472 A1* | 5/2023 | Lee | H04B 7/0602 |
| | | | 343/702 |

OTHER PUBLICATIONS

Written Opinion of the International Searching Authority for corresponding PCT/EP2021/071642 dated Oct. 26, 2021.

* cited by examiner ns
MILLIMITER-WAVE ANTENNA SYSTEM FOR RADIOMOBILE COMMUNICATIONS IN VEHICLES The present invention relates to a mobile wireless communication system installed in a vehicle, which uses a plurality of millimeter-wave antenna modules, and, in particular, to a method that allows the central unit to select and control in real time the antenna or the antennas with the best conditions of the transceiver channel.

Currently, a communication system called 4G is used for wireless data traffic. In order to meet the growing demand for wireless data traffic, efforts are being made to develop a more advanced communication system known as 5G. In order to achieve higher data transmission rates, millimeter-wave (mmW) bands have been allocated to 5G communication systems. However, in such a frequency range, the attenuation due to the propagation of the radio waves in a free space or to the presence of obstacles is very high. It is therefore necessary to increase the gain of the transceiver antennas in order to compensate for the losses and increase the transmission distance of the radio waves (coverage). For this purpose, different techniques can be used for conditioning the multiple inputs and outputs, such as beamforming (dynamic modification of the transceiver beam) and/or beamsteering (dynamic addressing of the transceiver beam), MIMO (Multiple Input—Multiple Output), as well as other solutions related to coding, modulation, etc..

In vehicles, such as cars, the presence of the vehicle itself, which is typically made of or coated with metal, causes an impenetrable shielding to electromagnetic waves, and especially in the millimeter bands. To overcome such a problem, a plurality of antennas must be installed on the vehicle in order to guarantee the possibility of communicating with radio base stations (BS), in whichever direction they are located with respect to the vehicle, thus improving the stability of the mobile communication system and the user experience.

U.S. Pat. Nos. 5,767,793 and 6,034,641 disclose millimeter-wave radar antennas for vehicles suitable for detecting the presence of obstacles. However, in such a case, the radar does not need to communicate with a radio base station (BS); therefore no decision is required as to which radar antenna is to be used because all radar antennas operate simultaneously to detect the presence of obstacles in their visible range.

In devices that are typically much smaller than a vehicle, such as, for example, mobile phones (smartphones), handheld devices (tablets), portable electronic computers (notebooks), etc., several antennas placed in different locations are used and one or more antennas with the best channel quality are chosen.

WO2019156468-A1 and US20200044314 disclose sensors installed in a device to select the antenna, such as 6-axes sensors or touch sensors (capacitive sensors or sensors with other technologies). However, in these applications, the distance between the control unit and the antennas to be selected and/or controlled is short (a few centimeters), therefore a communication with the antennas in a single electronic board is possible by means of dedicated traces and signals with little or no complexity.

Instead, in vehicles, the length of the connection cables between the central control unit and the remote antenna modules is such (typically more than 2 meters) that different types of solutions are required for the communication and the selection of the antennas.

US2018/269915 discloses a conventional antenna system for vehicles, which comprises a plurality of antenna modules. Each module comprises only one antenna of conventional type and not a millimeter wave antenna. Since the module comprises only one antenna, obviously the module does not have an RF front end capable of executing a beamforming or beamsteering to vary the pointing of the beam of the antennas. Without varying the pointing, the antenna gain will be too poor to ensure an adequate communication connection due to the high path attenuation that occurs with millimeter-wave signals and not in bands with a lower frequency. Such an antenna system provides for remotely controlling a single phase and a single gain of each module. The module does not have an RF front end with beamforming that simultaneously controls the phase and the gain of several antennas in the module. Such an antenna system operates at low frequencies, which do not require a frequency conversion in order to remotely transmit analogic signals, as it is necessary for millimeter waves. The system executes an up-down conversion at an intermediate frequency (lower than the frequency of the carrier) for the purpose of a partial modulation/demodulation in order to reduce the necessary transmission and reception band and not to overcome signal losses due to very high frequencies. Such a document discloses a phase and amplitude variation between the different antenna modules located in the vehicle and does not provide for a beamforming, varying the phase and amplitude of several antennas in the same antenna module.

US2018/288763 discloses a millimeter-wave antenna system based on timing for the selection of an antenna. The individual antenna has no ability to change its beamforming and therefore no control over the antenna module is required. Such a system provides for a switch between the available antennas without any control of the beam of each individual antenna, without phasing, and without front end capable of executing the beamforming. Despite being mentioned, the beamforming is not supported by a description of how the beamforming can be remotely regulated from the central control unit. The antenna modules are close to each other, can be easily selected by means of a switch (including a mechanical switch) and are close to the control unit that controls the modules very simply with a direct digital connection. Therefore US2018/288763 does not deal with the issue of establishing a control communication from the central unit to remote modules connected via coaxial or digital cables (e.g.: Ethernet).

US2006/172712 discloses a vehicle-mounted non-millimeter wave antenna system.

US2019/393883 discloses a vehicle-mounted digital antenna system. The system does not comprise millimeter-wave antennas, or a module with an antenna array, or an RF front end capable of executing a beamforming between the antennas of a module. Such a document describes an analogic control circuitry of the antenna in an analogic/digital converter that can be placed remotely from the antenna array, that is to say after an analogic connection. Such a solution is not compatible with millimeter waves because the losses between the antenna structure and the amplifiers contained in the analogic/digital converter would be excessive and would severely impair the performance of the mmW system.

The purpose of the present invention is to eliminate the drawbacks of the prior art by providing an antenna system for radio communications in vehicles that is capable of selecting and controlling, in real time, the antenna or antennas with the best conditions of the transceiver channel.

Another purpose is to provide an antenna system that is efficient, effective, reliable, versatile and easy to install.

These purposes are achieved according to the invention with the characteristics of the independent claims.

Advantageous embodiments of the invention appear from the dependent claims.

The present invention relates to an antenna system for 5G communication in vehicles capable of supporting a higher data transmission rate compared to a 4G system, as well as to the ways in which such an antenna system can be achieved. The antenna system according to the invention can be applied to different types of vehicles (such as cars, commercial vehicles, vans, trucks, trains, motorbikes, tractors, etc.) based on the 5G communication standard and on the related technologies.

The antenna system according to the invention comprises at least one antenna module. Each antenna module comprises a plurality of radiant elements that use a millimeter wave band. The antenna modules are positioned remotely from a central unit. The radiant elements have a variable beam. Each antenna module has an RF front end capable of executing a beamforming on the radiant elements of a module. The antenna modules can be installed on the vehicle remotely from the central control unit, precisely because of the communication and control system of the modules described in the present patent application.

The central unit is capable of selecting in real time at least one radiant element with the best conditions of the transceiver channel.

In such a way, the selected radiant element can receive and transmit signals with improved performance based on the detection of the quality of the signal received from the central unit.

Additional features of the invention will appear manifest from the following detailed description, which refers to a merely illustrative, not limiting embodiment, as shown in the appended figures, wherein.

Figure 1:
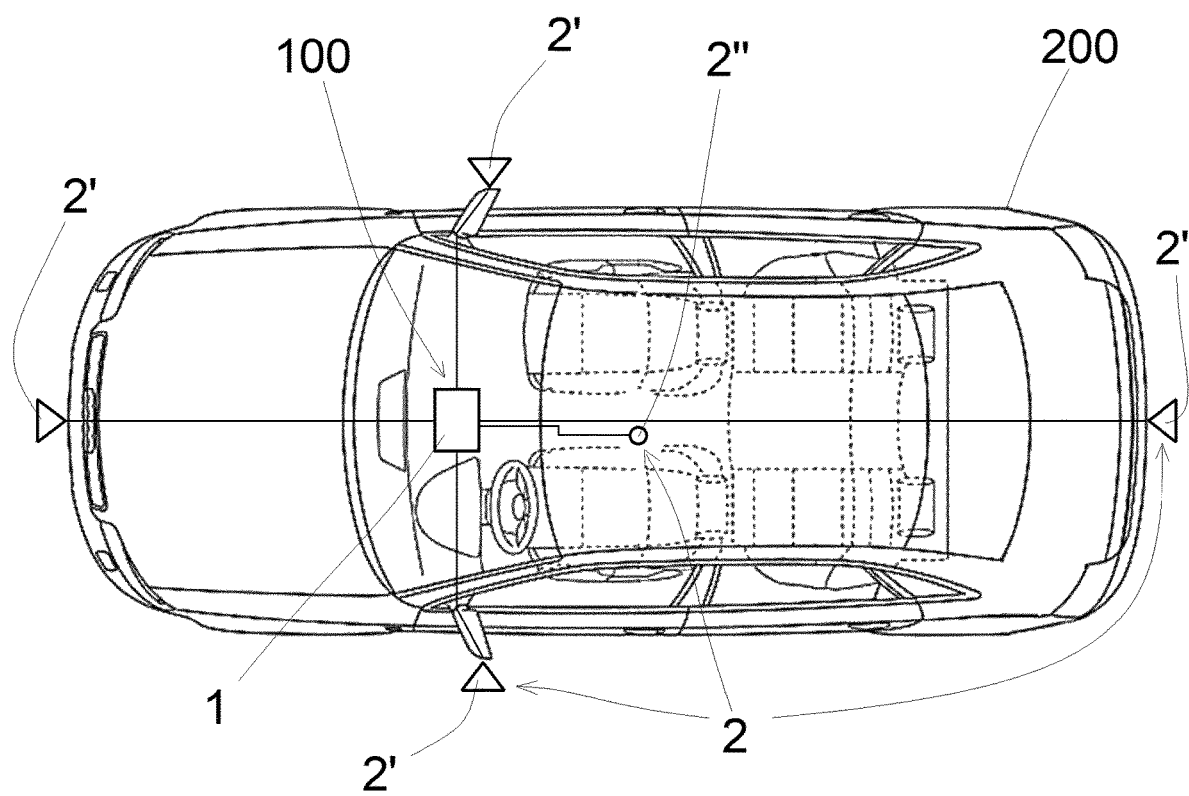
FIG. 1 is a schematic view of the antenna system according to the invention, illustrating a central control unit connected to remote antenna modules located in various parts of a vehicle.

With reference to the Figures, the antenna system according to the invention is disclosed, which is generally indicated with reference numeral (100).

With reference to FIG. 1, the system (100) comprises a central control unit (1) connected to a plurality of remote antenna modules (2) located in various positions in a vehicle (200) and connected to the central control unit (1) via coaxial or digital cables.

The system (100) is installed on the vehicle (200), therefore flows of signals transmitted from the system (100) to a base radio station (uplink) and flows of signals transmitted from the base radio station to the system (100) (downlink) are considered.

The future mobile communication technology, which is commonly known as 5G (an evolution of the LTE through the 3GPP body), provides for using millimeter-wave bands in order to increase the bandwidths available for massive data transmission. Specifically, the FR2 band covers 24.25 GHz to 52.6 GHz. At these frequencies, the path attenuation of the millimeter waves in the free space is extremely high.

Therefore, the remote antenna modules (2) comprise high-gain antennas with a narrow beam that can be dynamically addressed using special techniques, such as the beam-steering and/or beamforming.

Moreover, any obstacles, particularly those composed of metallic materials, are practically insurmountable for the propagation of the millimeter waves. For these reasons, the installation of the remote antenna modules (2) on a vehicle in these frequency bands has been studied and analyzed in detail in order to identify suitable antenna positions in such a way that the body and the other parts of the car structure do not obstruct the line of sight (LOS) of each antenna. In any case, the installation can be studied and optimized on a vehicle-by-vehicle basis in order to maximize the performance and guarantee the maximum horizon coverage.

The remote antenna modules (2) can use types of antenna with different radiative characteristics. The remote antenna modules (2) comprise limited horizon field antennas (2') located on the front, on the back and on the sides of the vehicle body (e.g. in the side mirrors) or integrated in the headlights or in the bumpers of the vehicle, and possibly other full horizon field antennas (2") located in an area with a wide view of the horizon, such as for example a central part of the vehicle roof.

Figure 2:
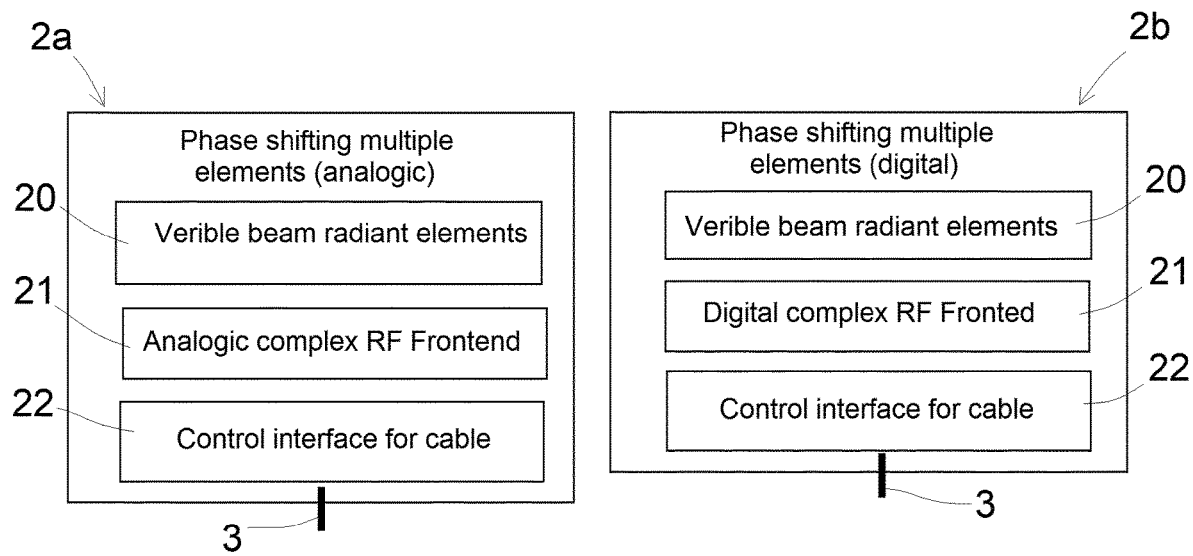
FIG. 2 shows four block diagrams of possible structures of a remote antenna module of the antenna system according to the invention.

With reference to FIG. 2, the remote antenna modules (2) may comprise different types of antenna modules (2a, 2b). Each antenna module comprises:
  a plurality of radiant elements (20) suitable for receiving and transmitting a millimeter wave signal;
  an RF front end (21) comprising a circuitry for managing the signal transmitted or received by the radiant element and the beamsteering/beamforming functionality of the radiant elements (20);
  a control interface (22) for connecting the antenna module (2) to an electrical cable (3), such as a coaxial or a digital cable.

Advantageously, the radiant elements (20) of each module are arranged in an array. The radiant elements (20) have a variable beam.

The antenna modules (2a, 2b) have several radiant elements (20) that can be powered in such a way to vary the module and phase of the radiation beams. In such a case, the RF front ends (21) are complex because they must be capable of handling a beamforming/beamsteering.

The antenna module (2a) has an RF front end (21) that handles a beamforming/beamsteering of analog type; instead, the antenna module (2b) has an RF front end (21) that handles a beamforming/beamsteering of digital type.

Moreover, the remote antenna modules (2) may comprise antenna modules provided with RF front ends for handing a hybrid beamforming/beamsteering realized with a mixed digital/analogic method.

Figure 2A:
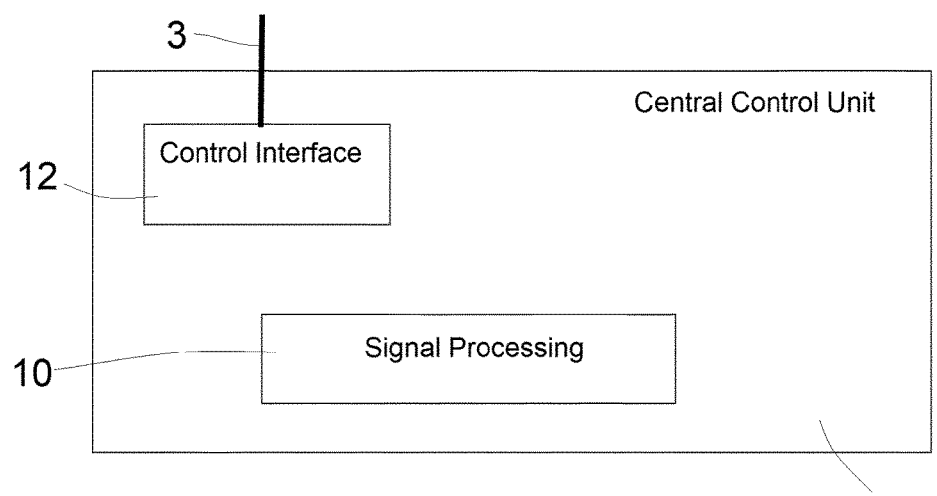
FIG. 2A illustrates a block diagram of a central control unit of the antenna system according to the invention.

With reference to FIG. 2A, the central control unit (1) comprises a signal processor (10), such as a modem connected to a control interface (12) for connecting the central control unit (1) to the electrical cable (3).

Due to the distance between the remote antenna modules (2) and the central control unit (1), a number of measures are required on the control interfaces (12, 22) of the central control unit (1) and of the remote antenna modules (2). In particular, the control interfaces (12, 22) are configured in such a way to permit a transmission, over the electrical cable (3), of input and output data signals and of control signals suitable for controlling the control interface (22) and the RF front end (21) of the remote antenna module.

Figure 3:
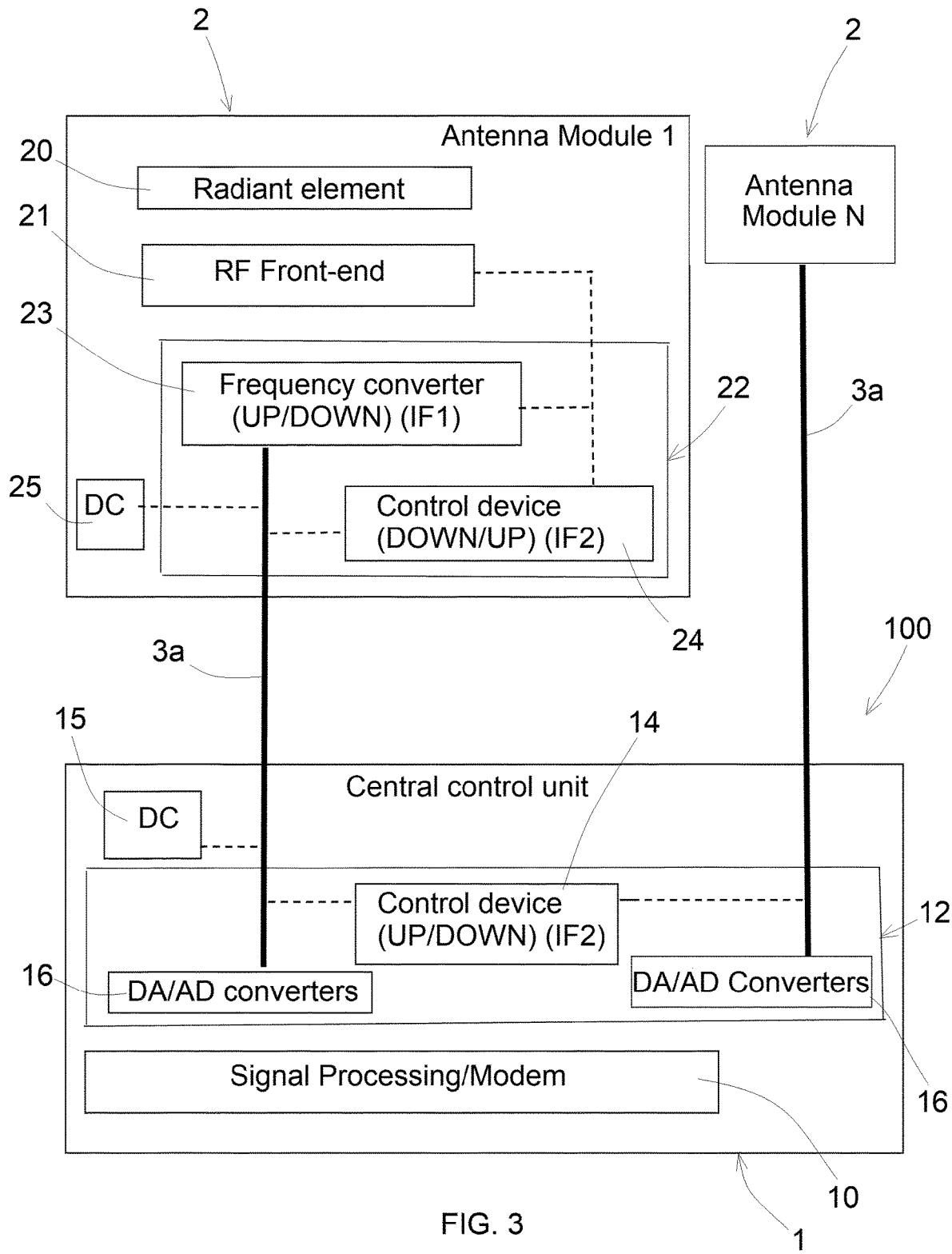
FIG. 3 is a block diagram, illustrating the antenna system according to the invention in the case of connection between the remote antenna modules and the central control unit via coaxial cables.

FIG. 3 shows the antenna system (100) wherein the connection between the remote antenna modules (2) and the central control unit (1) is via coaxial cables (3a).

The central control unit (1) comprises a signal processor (10), such as a modem, and a control interface (12) connected to the signal processor (10) and to the coaxial cables (3a) connected to the remote antenna modules (2).

The remote antenna module (2) comprises:
 a plurality of radiant elements (20) with variable beam and of millimeter wave type,
 an RF front end (21) capable of executing a beamforming between the radiant elements, and
 a control interface (22).

The control interface (22) comprises a frequency converter (23) and a control device (24).

The frequency converter (23) is connected to the RF front end (21) and to the control device (24).

The frequency converter (23) allows for the transmission via the coaxial cable (3a) of an input data signal (S0) (FIG. 3A) received from the antenna module. In fact, the coaxial cable (3a) can be very long (more than two meters) and, consequently, it can introduce a considerable attenuation on signals in the frequency band of the millimeter waves, while it will introduce a much lower attenuation on signals at an intermediate frequency (IF) of a few GHz.

Additionally, the frequency converter (23) converts the frequency of an output data signal (St) (FIG. 3A) that will be transmitted by the antenna module.

Therefore, the frequency converter (23) converts an input data signal (S0) (FIG. 3A) at millimeter frequencies received by the radiant element (20) into a data signal at a first intermediate frequency (IF1) comprised between 1 GHz and 6 GHz depending on the signal bandwidth and converts an output data signal (St) from the signal processor (10) at the first intermediate frequency (IF1), or at another IF within the same frequency band, into a data signal at millimeter frequencies in order to be transmitted by the radiant element (20).

In addition to the input and output data signals (S0, St) coming from and directed to the frequency converter (23), control signals (S1, S2) coming from the signal processor (10) of the central control unit are conveyed on the same coaxial cable (3a) in order to control the frequency converter (23) and the RF front end (21), respectively. The control signals (S1, S2) comprise low complexity signals and high complexity signals.

Figure 5:
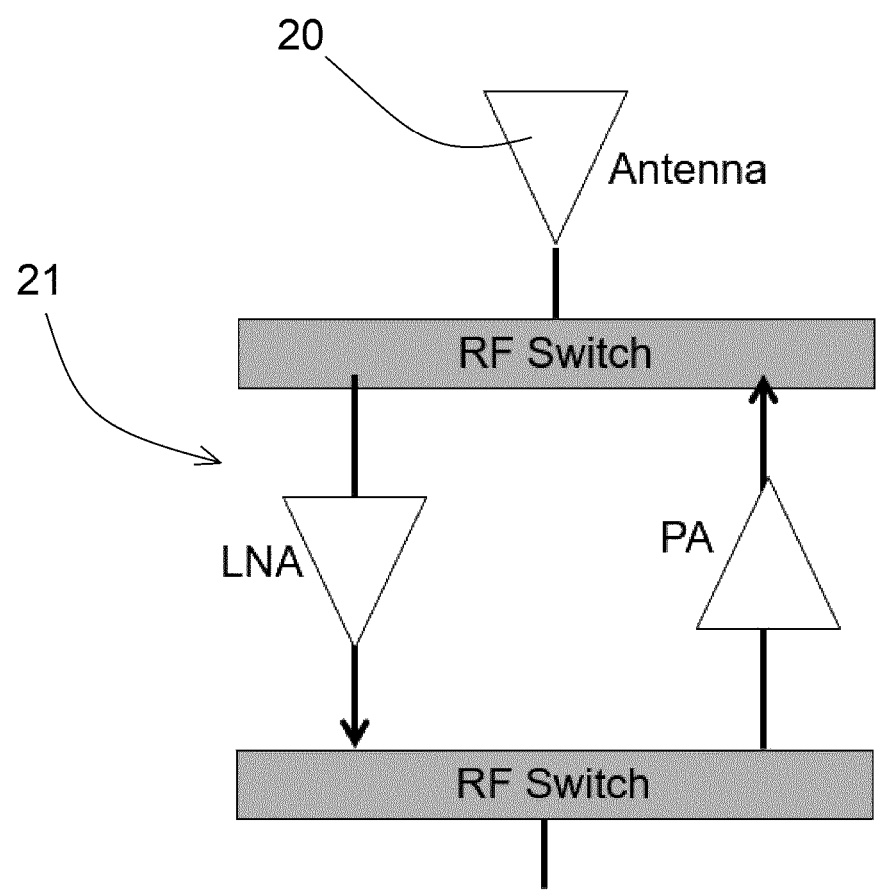
FIG. 5 is a block diagram, illustrating a minimum architecture in the case of a single millimeter wave radiant element.

The low complexity signals are used to choose between a power amplifier (PA) in transmission and a low noise amplifier (LNA) in reception, as shown in FIG. 5.

Instead, the high complexity signals are used to control an RF front end (21) capable of handling an analogic beamforming, such as in the case of the antenna module (2a), or an RF front end (21) capable of handling a digital beamforming, such as in the case of the antenna module (2b).

In the case of an analogic beamforming, the high complexity control signals are used to control a network of phase shifters and power amplifiers (PA) or low noise amplifiers (LNA) that are necessary for the analogic beamforming functionality.

In case of a digital beamforming, the high complexity control signals are used to control a digital beamforming stage that typically comprises controllable phase shifters, amplitude (weight) controls of the signals coming from each sub-antenna in the array, frequency converters, D/A and A/D converters, clock control, adaptive filters, etc..

The control interface (12) of the central control unit (1) comprises a control device (14) that communicates with a control device (24) provided in the control interface (22) of the remote antenna module (2) to carry the control signals (S1, S2) on the same coaxial cable (3a) whereon also the input and output data signals (S0, St) converted at the first intermediate frequency (IF1) are transmitted.

The control device (14) of the central control unit consists of a frequency converter of UP type capable of converting the control signals (S1, S2) at a second intermediate frequency (IF2) different from the first intermediate frequency (IF1) used for the transmission of the data signals (S0, St). For illustrative purposes, the second intermediate frequency (IF2) can be comprised in the range between 0.1 GHz and 1 GHz. In such a way, no interference is generated between the input and output data signals (S0, St) and the control signals (S1, S2).

The control device (14) of the central control unit (1) comprises a transceiver (41) for converting the control signals coming from the signal processor (10) into the second intermediate frequency IF2.

The control device (24) of the antenna module (2) is a DOWN frequency converter suitable for converting the control signals (S1, S2) from the second intermediate frequency (IF2) to a lower frequency in order to control the frequency converter (23) and the RF front end (21). Moreover, the control device (24) of the antenna module interprets the control signals (S1, S2) and acts accordingly on the frequency converter (23) and the RF front end (21). For this purpose, the control device (24) of the antenna module comprises a transceiver that converts the signals from the second intermediate frequency IF2 and a logic device, such as a microcontroller or an ASIC or an FPGA.

Additionally, the remote antenna modules (2) must be electrically powered via the same coaxial cable (3a) used for the passage of data and control signals. Therefore, the central control unit (1) and the remote antenna module (2) comprise respective power supply blocks (15, 25) that are in communication with each other via the coaxial cable (3a). The power supply block (25) of the antenna module is capable of recovering the direct current (DC) power from the coaxial cable (3a), without disturbing the high frequency signals (S0, St, S1, S2) that travel on the coaxial cable at the intermediate frequencies IF1 and IF2.

The control interface (12) of the central control unit (1) comprises a plurality of DA/AD converter units (16), wherein each DA/AD converter unit (16) is connected to a respective remote antenna module (2). Each DA/AD converter assembly (16) comprises an digital analogic (DA) converter and an analogic digital (AD) converter.

Since the system (100) comprises several remote antenna modules (2), it is possible to select a single remote antenna module at a time, or to combine the signal received from several remote antenna modules by means of digital or analogic methods, i.e. antenna array or diversity or MIMO techniques of various type (amplitude and/or phase mixing of several signals carried out in analogic or digital via DSP). In its simplest version, the selection of an antenna is performed by detecting the signal level (RSSI) of each antenna and obviously choosing the antenna that provides the highest signal level (at the highest power).

Figure 3A:
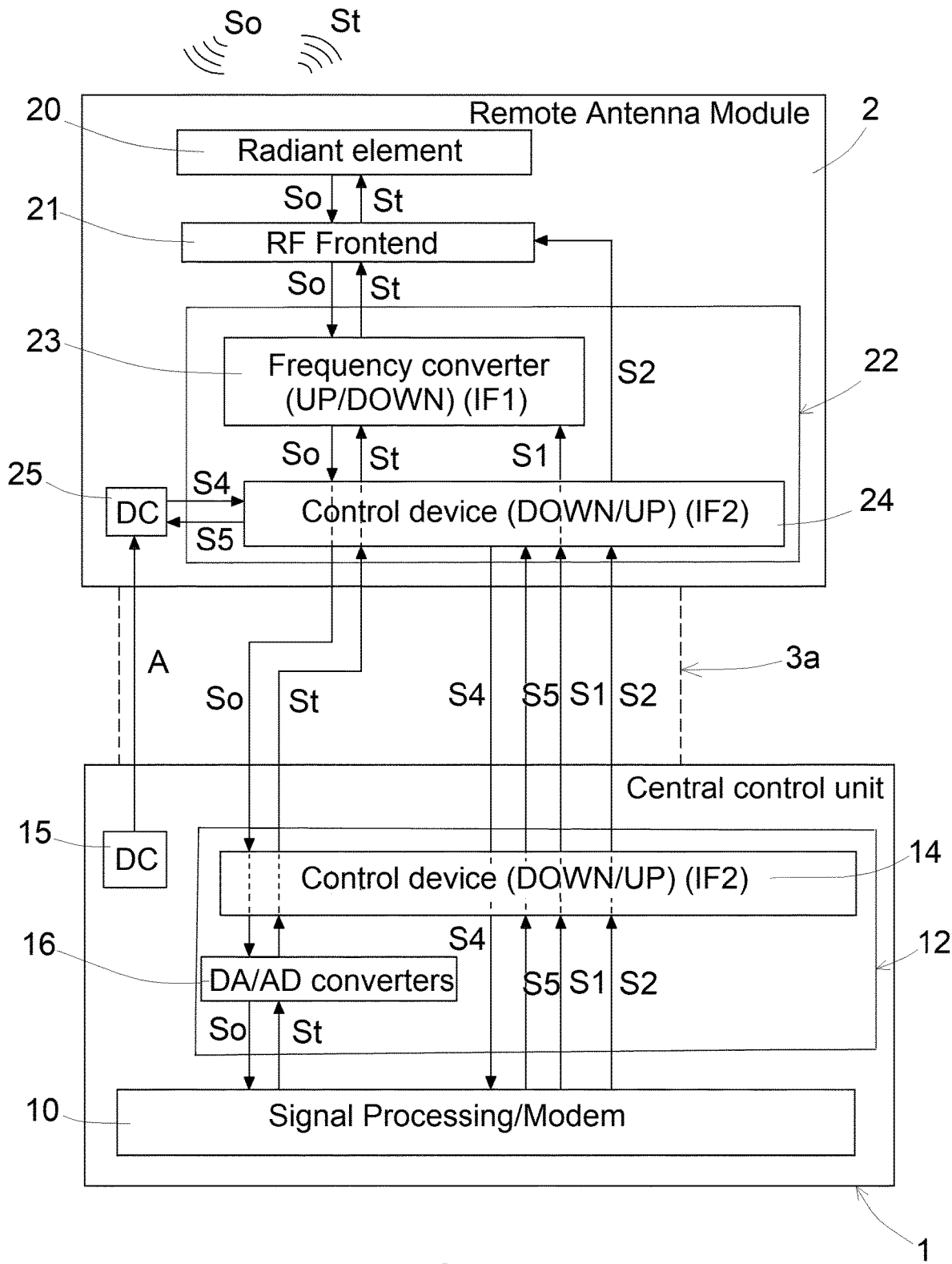
FIG. 3A is a block diagram as FIG. 3, illustrating the direction of the signals managed by the antenna system according to the invention.

With reference to FIG. 3A, during reception, the input data signal (S0) picked up by the radiant element (20) must be sent to the signal processor (10). For this purpose, the radiant element (20) picks up a millimeter-wave input data signal (S0) that is amplified and routed on a correct path by the RF front end (21). The input data signal (S0) is sent to the frequency converter (23) in order to be converted to the first intermediate frequency (IF1) and introduced onto the coaxial cable (3a) that carries the input data signal (S0) to an A/D converter of the converter unit (16) of the central control unit which digitizes the input data signal (S0) and sends it to the signal processor (10). Obviously, the converter (16) must be capable of sampling the input data signal (S0) at the first intermediate frequency.

During transmission, the output data signal (St) from the signal processor (10) must be sent to the radiant element (20) in order to be transmitted in the ether. For this purpose, the signal processor (10) outputs the output data signal (St) in a digital format. The converter unit (16) converts the output data signal (St) from digital to analogic at a first intermediate frequency IF1. Obviously, the converter unit (16) must have a DA converter capable of making the conversion at the first intermediate frequency (IF1). The output data signal (St) at the first intermediate frequency IF1 is transmitted over the coaxial cable (3a) and reaches the frequency converter (23) of the remote antenna module (2) that converts it at millimeter frequencies. The output data signal (St) at millimeter frequencies is amplified and routed by the RF front end to the radiant element (20) which transmits it into the ether.

The control signals (S1, S2) are generated by the signal processor (10) and are sent to the control device (14) of the central control unit which converts them to a second intermediate frequency (IF2) and introduces them in the coaxial cable (3a). The control signals (S1, S2) at the second intermediate frequency (IF2) reach the control device (24) of the remote antenna module (2) and are converted to a lower frequency suitable for controlling the frequency converter (23) and the RF front end (21), respectively.

A power supply signal (A) is sent on the coaxial cable (3a) from the power supply block (15) to the power supply block (25) which powers all the active devices of the remote antenna module (2).

The power block (25) of the remote antenna module (2) sends a diagnostic signal (S4) indicating the status of the power block (25) to the control device (24). The control device (24) converts the diagnosis signal (S4) to the second intermediate frequency IF2. In such a case the control device (24) must have an UP converter to transfer the diagnosis signal (S4) to the second intermediate frequency (IF2). The diagnosis signal (S4) at the second intermediate frequency (IF2) is sent via the coaxial cable (3a) to the control device (14) of the central control unit (1) which converts it to a lower frequency and sends it to the signal processor (10) which detects any anomalies of the power supply. Therefore, the control device (14) of the central control unit must provide for a DOWN frequency converter in order to lower the frequency of the diagnosis signal (S4).

The control signals that travel from the central control unit (1) to the remote antenna module (2) comprise a power control signal (S5) which must reach the power block (25) of the remote antenna module. The power control signal (S5) follows the same path as the control signals (S1, S2) and travels from the control unit (24) to the power block (25).

Figure 6:
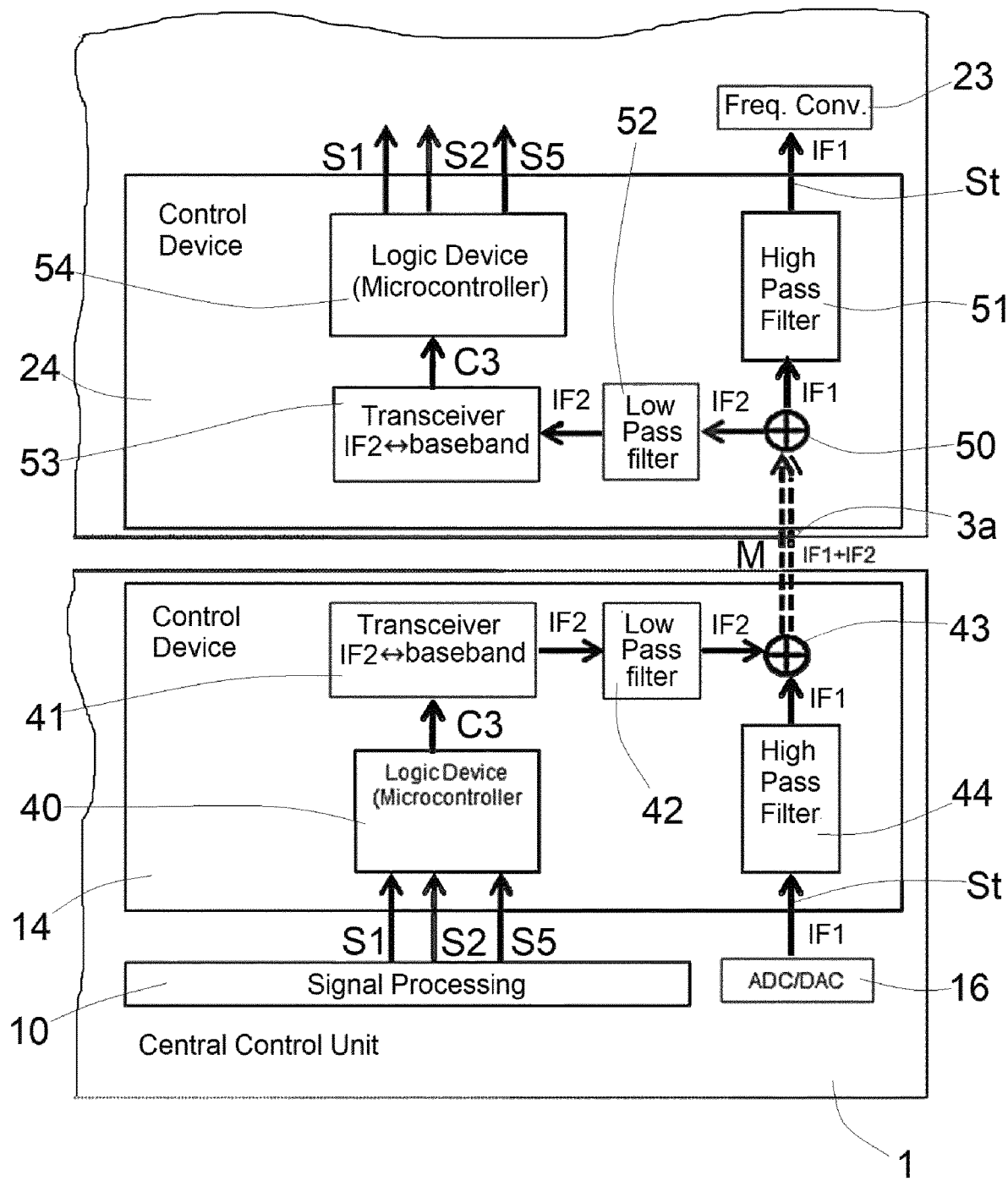
FIG. 6 is a block diagram, illustrating the control devices of the system of FIG. 3 in detail.

With reference to FIG. 6, the control device (14) of the central control unit comprises a logic device (40) which receives the control signals (S1, S2, S5) coming from the signal processor (10). The logic device (40) processes and encapsulates the control signals (S1, S2, S5) into an encapsulated signal (C3) that is sent to a transceiver (41) which converts this encapsulated signal (C3) to the second intermediate frequency (IF2). The encapsulated signal (C3) at the second intermediate frequency (IF2) passes through a low-pass filter (42) suitable for blocking the first intermediate frequency IF1 present on the coaxial cable (3a) and is then sent to a mixer (43) where it is mixed with the output data signal (St) at the first intermediate frequency (IF1). Optionally, the control device (14) of the central control unit comprises a high-pass filter (44) suitable for blocking the second intermediate frequency IF2 present on the coaxial cable (3a) before reaching the converter unit (16).

A mixed signal (M) comprising the encapsulated signal (C3) and the output data signal (St) is output from the mixer (43). Such a mixed signal is sent on the coaxial cable (3a) and reaches a demixer (50) provided in the control unit (24) of the remote antenna module.

The demixer (50) separates the encapsulated signal (C3) at the second intermediate frequency (IF2) from the output data signal (St) at the first intermediate frequency. The encapsulated signal (C3) at the second intermediate frequency (IF2) from the demixer (50) passes through a low-pass filter (52) which blocks the first intermediate frequency IF1 and reaches a transceiver (53) of the control device of the antenna module. The transceiver (53) returns the encapsulated signal (C3) to the baseband and sends it to a logic device (54) which decapsulates the control signals (S1, S2, S5).

Optionally, the control device (24) of the remote antenna module may comprise a high-pass filter (51) to block the second intermediate frequency IF2 at the output of the demixer (50)

Figure 7:
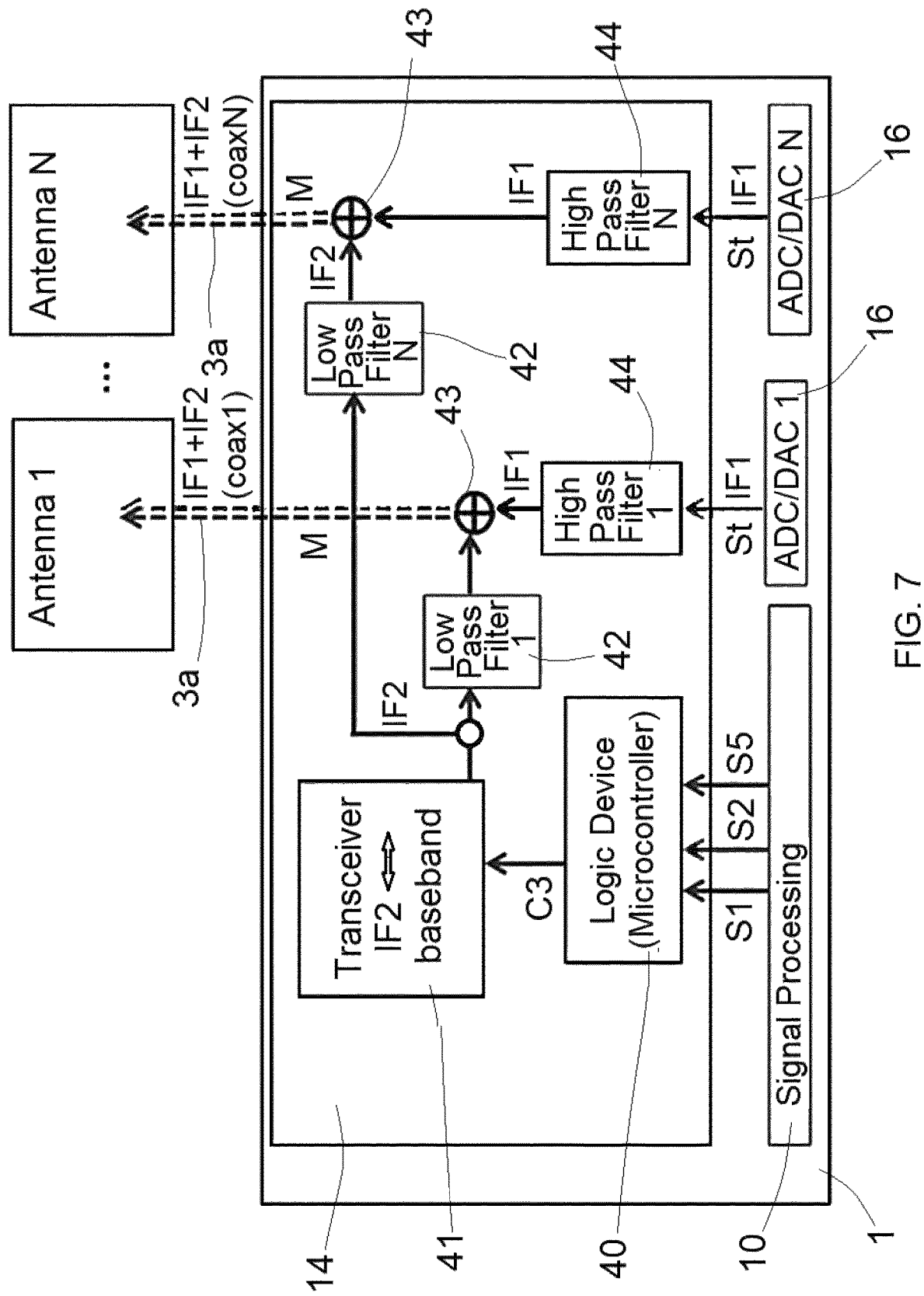
FIG. 7 is a block diagram as FIG. 3, illustrating the control device of the central control unit in detail.

With reference to FIG. 7, in case of more than one remote antenna modules (2), the encapsulated signal (C3) at the second intermediate frequency (IF2) from the only transceiver (41) of the control device of the central control unit is mixed with the output data signal (St) at the first intermediate frequency (IF1) from each DA converter of the converter unit (16) and the mixed signal (M) is sent on the respective coaxial cable (3a) connected to the respective antenna. In such a case there will be a number of low-pass filters (42) and of mixers (43) equal to the number of antennas (2).

Figure 7A:
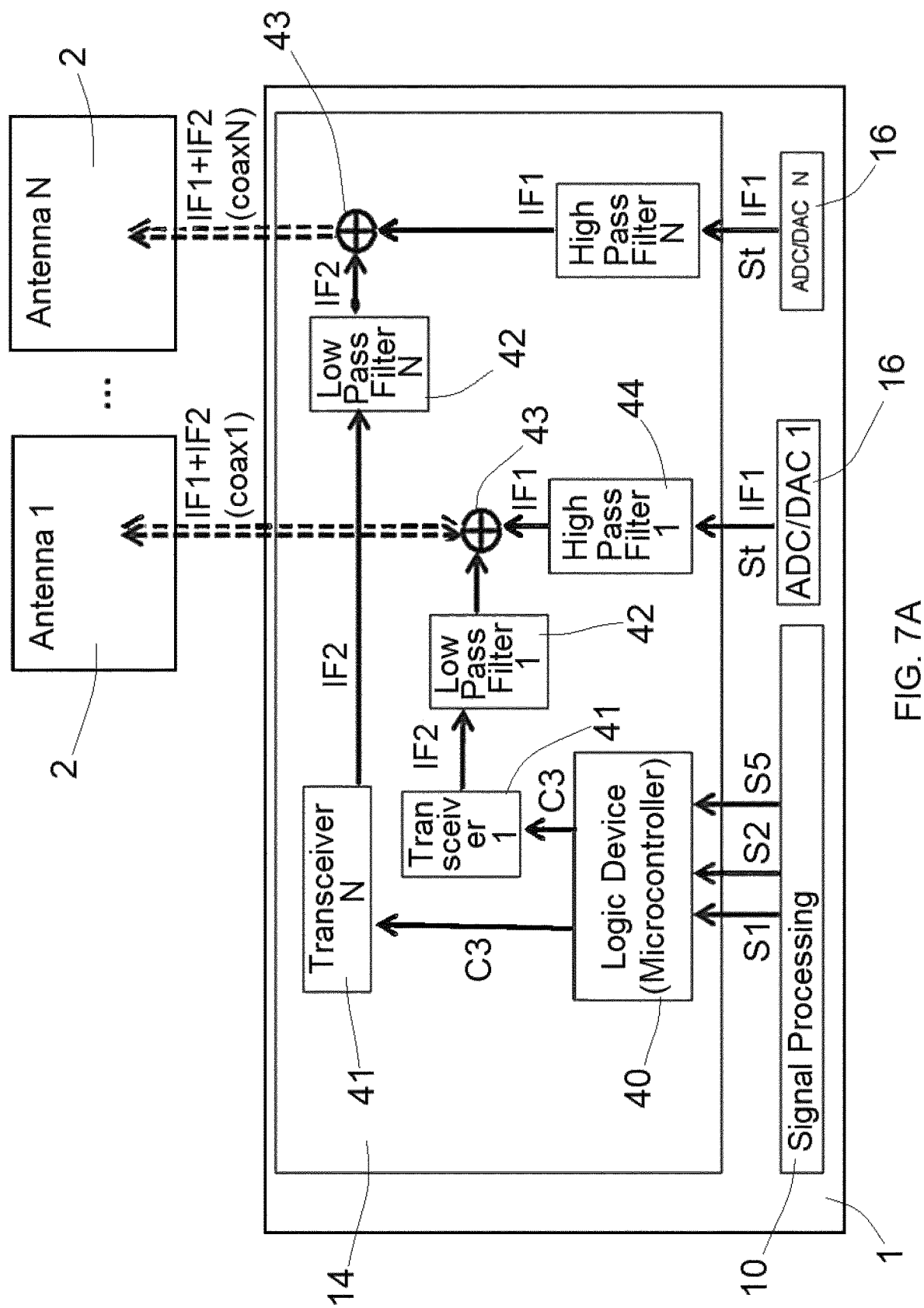
FIG. 7A is a block diagram as FIG. 7, illustrating a variant of the control device of the central control unit.

FIG. 7A illustrates a control device (14) of the central control unit comprising a number of transceivers (41) equal to the number of antennas (2). Each transceiver (41) outputs the encapsulated signal (C3) at the second intermediate frequency (IF2) which is mixed with the output data signal (St) at the first intermediate frequency (IF1) from each DA converter of the converter unit (16).

Figure 4:
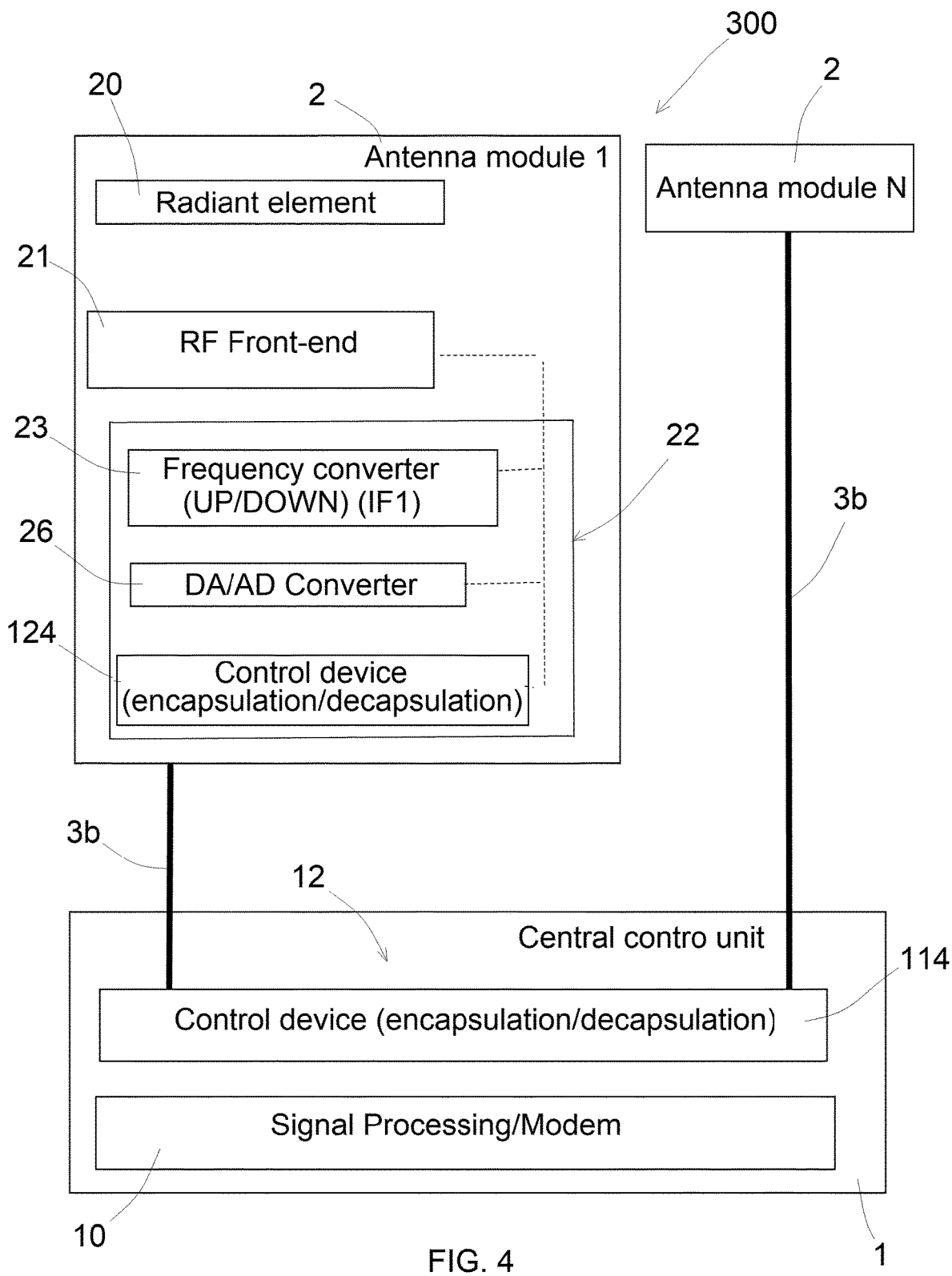
FIG. 4 is a block diagram, illustrating the antenna system according to the invention in the case of connection between the remote antenna modules and the central control unit via high-speed digital cables.

FIG. 4 illustrates a second embodiment of an antenna system (300) based on the transmission of signals over digital cables (3b), such as, for example, Ethernet cables. Each remote antenna module (2) comprises at least one radiant element (20), an RF front end (21) and a control interface (22).

The control interface (22) comprises a frequency converter (23), a DA/AD converter unit (26) and a control device (124).

The DA/AD converter unit (26) comprises a digital-to-analogic (DA) converter and an analogic-to-digital (AD) converter suitable for making the analogic signals suitable for a digital transmission and vice versa.

The central control unit (1) comprises a signal processor (10) and a control interface (12) comprising a control device (114).

The control device (124) of the antenna module is suitable for including also the diagnostic signal (S4) of the status of the control device (124) in the flow of the input data signal (S0). The control device (114) of the central control unit is suitable for including also the control signals (S1, S2, S3) used to control the frequency converter (23), the RF front end (21) and the DA/AD converter unit in the flow of the output data signal (St).

The control device (124) of the antenna module is able to separate the output data signal (St) from the control signals (S1, S2, S3). The control device (114) of the central control unit is able to separate the input data signal (S0) from the diagnosis signal (S4).

For such a purpose, the control device (124) of the antenna module comprises digital transmission controllers, serializers/deserializers capable of encapsulating/decapsulating and digital signals, and a computing unit (e.g. a microcontroller, ASIC or FPGA) for managing the devices of the antenna module.

The control device (114) of the central control unit comprises digital transmission controllers and serializers/deserializers capable of encapsulating/decapsulating digital signals.

The input data signal (S0), the output data signal (St), the control signals (S1, S2, S3) and the diagnosis signal (S4) travel on the digital cable (3b) and are transceived from the remote antenna module (2) to the central control unit (1) by means of a direct communication between the two control devices (114, 124) of the remote antenna module and of the central control unit.

The control device (114) of the central control unit is directly connected with the signal processor (10).

In the case of connection of the antenna modules (2) to the central control unit by means of digital cables (3b), some poles of the digital cable (3b) can be dedicated to carry the DC power supply, avoiding the need for the power supply blocks (25, 15) shown in FIG. 3.

Figure 4A:
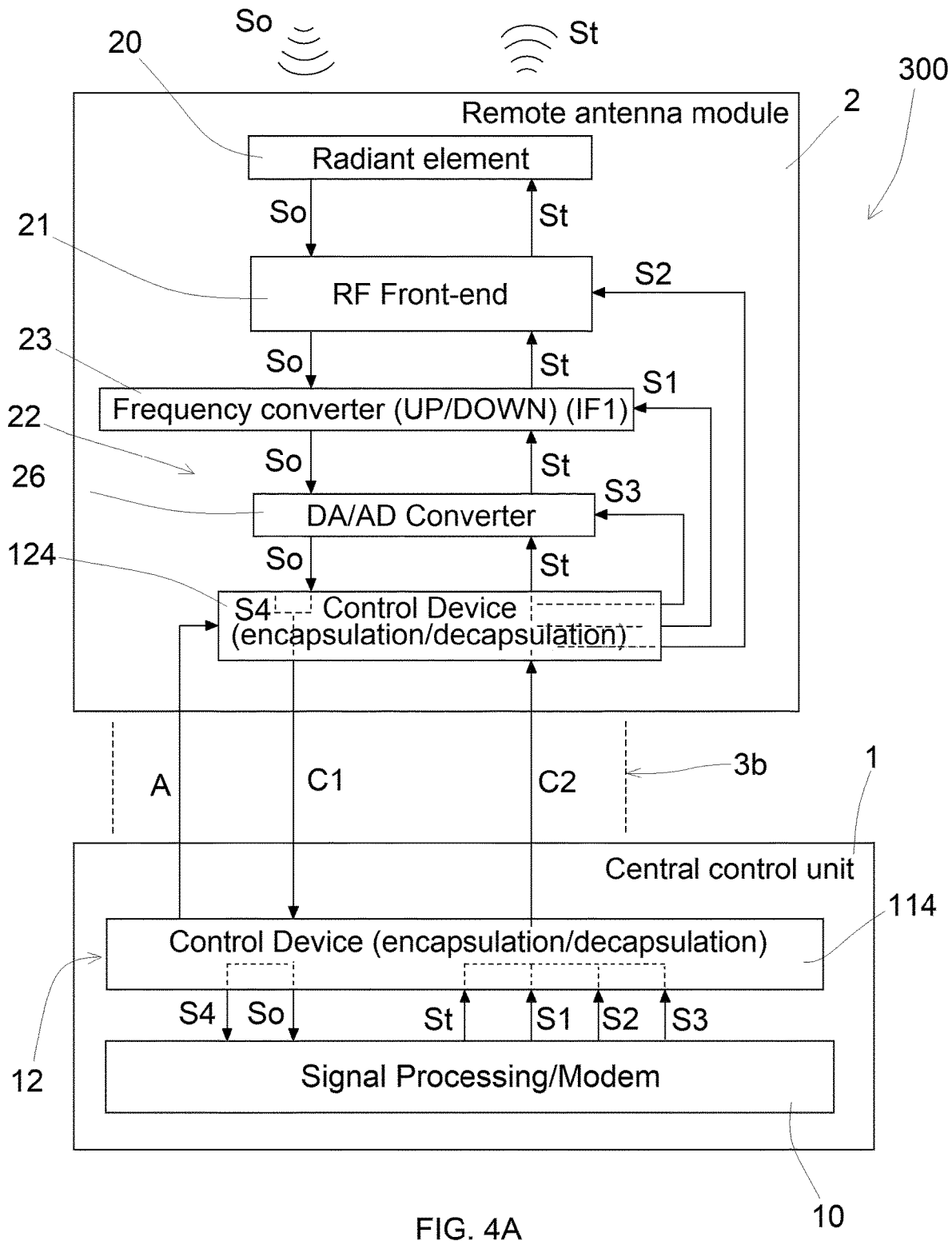
FIG. 4A is a block diagram as FIG. 4, illustrating the direction of the signals managed by the antenna system according to the invention.

With reference to FIG. 4A, during reception, the input data signal (S0) picked up by the radiant element (20) must be sent to the signal processor (10). For such a purpose, the input data signal (S0) at millimeter frequency is picked up by the radiant element (20) and is sent to the RF front end (21) which amplifies and routes it. The input data signal (S0) is converted by the frequency converter (23) from the millimeter frequency to an intermediate frequency (IF1) comprised between 0.1 GHz and 6 GHz. Then the input data signal (S0) is digitized by an AD converter of the converter unit (26).

The control device (124) encapsulates the input data signal (S0) together with the diagnosis signal (S4) in a digital communication protocol, so as to obtain an encapsulated signal (C1).

The control device (124) transmits said encapsulated signal (C1) (composed of the input data signal (S0) and the diagnosis signal (S4)) in digital format on the digital cable (3b). Then, the encapsulated signal (C1) in digital format reaches the control device (114) of the central unit which decapsulates it to obtain the input data signal (S0) which is sent to the signal processor (10).

During transmission, the output data signal (St) from the signal processor (10) must be sent to the radiant element (20) in order to be transmitted in the ether. For this purpose, the signal processor (10) outputs the output data signal (St) in a digital format. The control device (114) of the central control unit encapsulates the output data signal (St) with the control signals (S1, S2, S3) in order to obtain an encapsulated signal (C2) which is transmitted on the digital cable (3b). The encapsulated signal (C2) is received by the control device (124) of the remote antenna module and is decapsulated, in such a way to obtain the output data signal (St) in digital format. The output data signal (St) in digital format is sent to a DA converter of the converter unit (26) which converts it to analogic. The analogic output data signal (St) is converted to a millimeter frequency by the frequency converter (23). The output data signal (St) at millimeter frequencies is amplified and routed by the RF front end (21) to the radiant element (20) which transmits it into the ether.

The control signals (S1, S2, S3) are generated by the signal processor (10) in digital format and are sent to the control device (114) of the central control unit which encapsulates them together with the output data signal (St) in order to obtain the encapsulated signal (C2) which is transmitted on the digital cable (3b). The encapsulated signal (C2) (comprising the output data signal (St) and the control signals (S1, S2, S3)) is received by the control device (124) of the remote antenna module which decapsulates the signal in order to obtain the digital control signals (S1, S2, S3) to control the frequency converter (23), the RF front end (21) and the DA/AD converter unit (26), respectively.

The power signal (A) travels from the control device (114) of the central control unit to the control device (124) of the remote antenna module in order to power all the active devices of the remote antenna module.

A diagnosis signal (S4) is used to inform the signal processor (10) about the status of the control device (124) and about the status of the entire remote antenna module. The diagnosis signal (S4) is of digital type and is encapsulated together with the input data signal (S0) by means of the control device (124) of the remote antenna module in order to obtain the encapsulated signal (C1). Then, the encapsulated signal (C1) is transmitted via the digital cable (3b) and is received by the control device (114) of the central control unit which decapsulates it in order to obtain the diagnosis signal (S4) in digital format which is sent to the signal processor (10) to detect the status of the control device (124) and the status of the entire remote antenna module.

Figure 8:
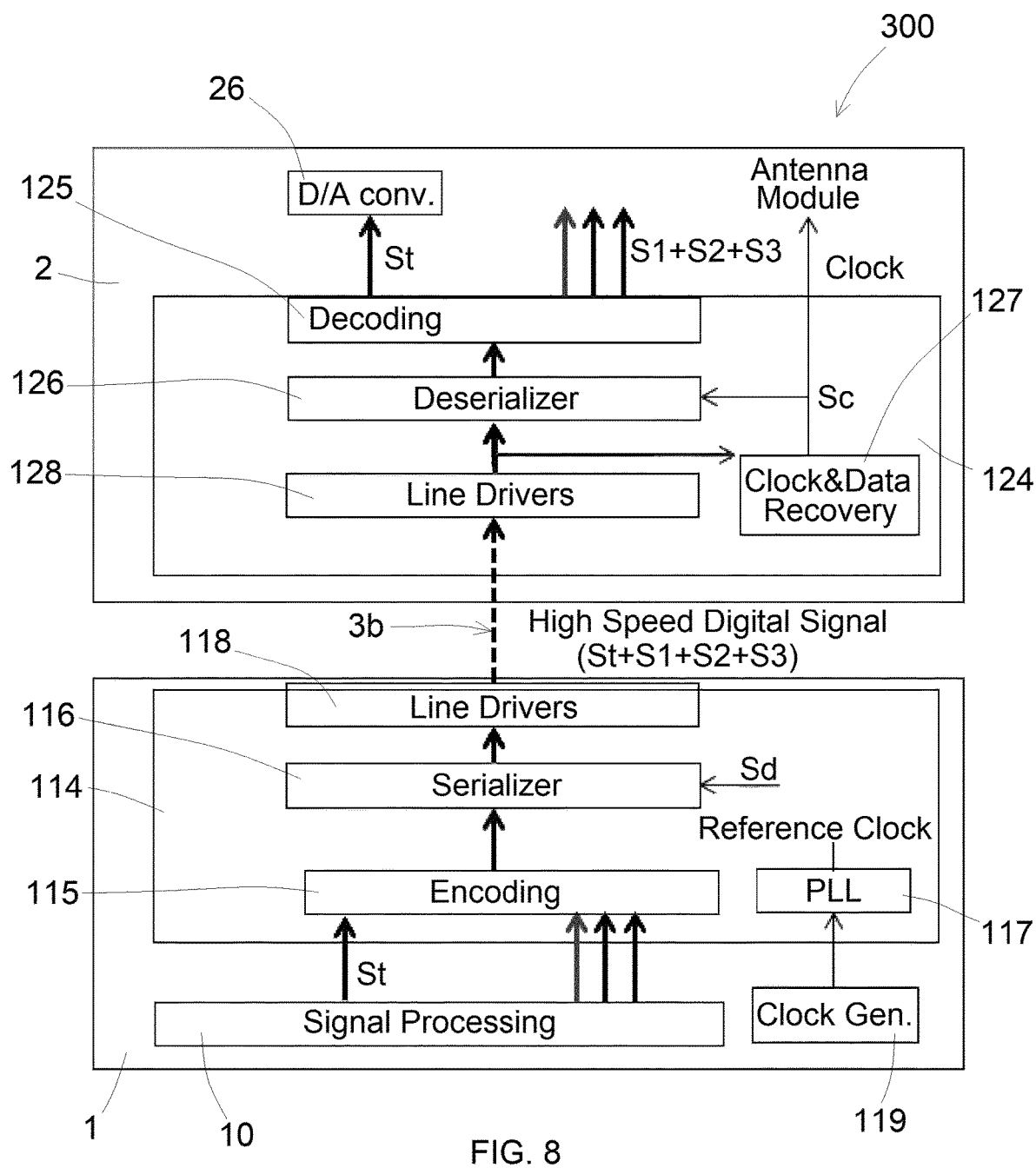
FIG. 8 is a block diagram, illustrating in detail the control devices of the central unit and of a remote antenna during a data transmission from the central unit to the remote antenna.

FIG. 8 illustrates a block diagram in the case of digital transmission from the control device (114) of the central control unit (1) to the control device (124) of a remote antenna module (2).

The control device (114) of the central control unit (1) comprises an encoding/decoding logic (115), a serializer/ deserializer (116), a clock recovery/phase-locked loop (PLL) circuit (117) and line drivers (118). The central control unit (1) comprises a clock generator (119) connected to the PLL (117) so that the PLL can generate a clock signal (Sc) which is sent to the serializer (116).

The control device (124) of the antenna module (2) comprises line drivers (128), a deserializer/serializer (126), a clock recovery/PLL device (127) and a decoding/coding logic (125).

The encoding logic (115) of the control device of the central control unit receives, processes and encodes the output data signal (St) and the control signals (S1, S2, S3) coming from the signal processor (10). The encoded signals are sent to the serializer (116) where they are queued in a single high-speed data flow together with the clock signal (Sc) that acts as synchronization time reference.

The queued signals (St, S1, S2, S3) are transmitted by the line driver (118) on the digital cable (3b).

The high-speed signal flow is received and possibly amplified by the line drivers (128) of the control device of the remote antenna module, and the clock signal (Sc) is recovered by the clock recovery device (127) and sent to the deserializer (126) in order to deserialize the signal flow. The flow of deserialized signals is sent to the decoding logic (125) wherein the output data signal (St) and the control signals (S1, S2, S3) are decapsulated and routed on the relevant buses.

The input data signal (S0) and any other control signals may flow in the opposite direction with respect to the one indicated in FIG. 8, that is to say, from the control device (124) of the remote antenna module to the control device (114) of the central control unit by reversing the operation of the various devices from the control device (124) of the remote antenna module to the control device (114).

In such a case, the decoding/encoding logic (125) operates as encoding logic, the deserializer/serializer (126) operates as serializer, the line drivers (128) introduce the signals in the digital cable (3b), the line drivers (118) receive the signals from the digital cable (3b), the serializer/deserializer (116) operates as deserializer and the decoding/encoding logic (115) operates as decoder.

Figure 9:
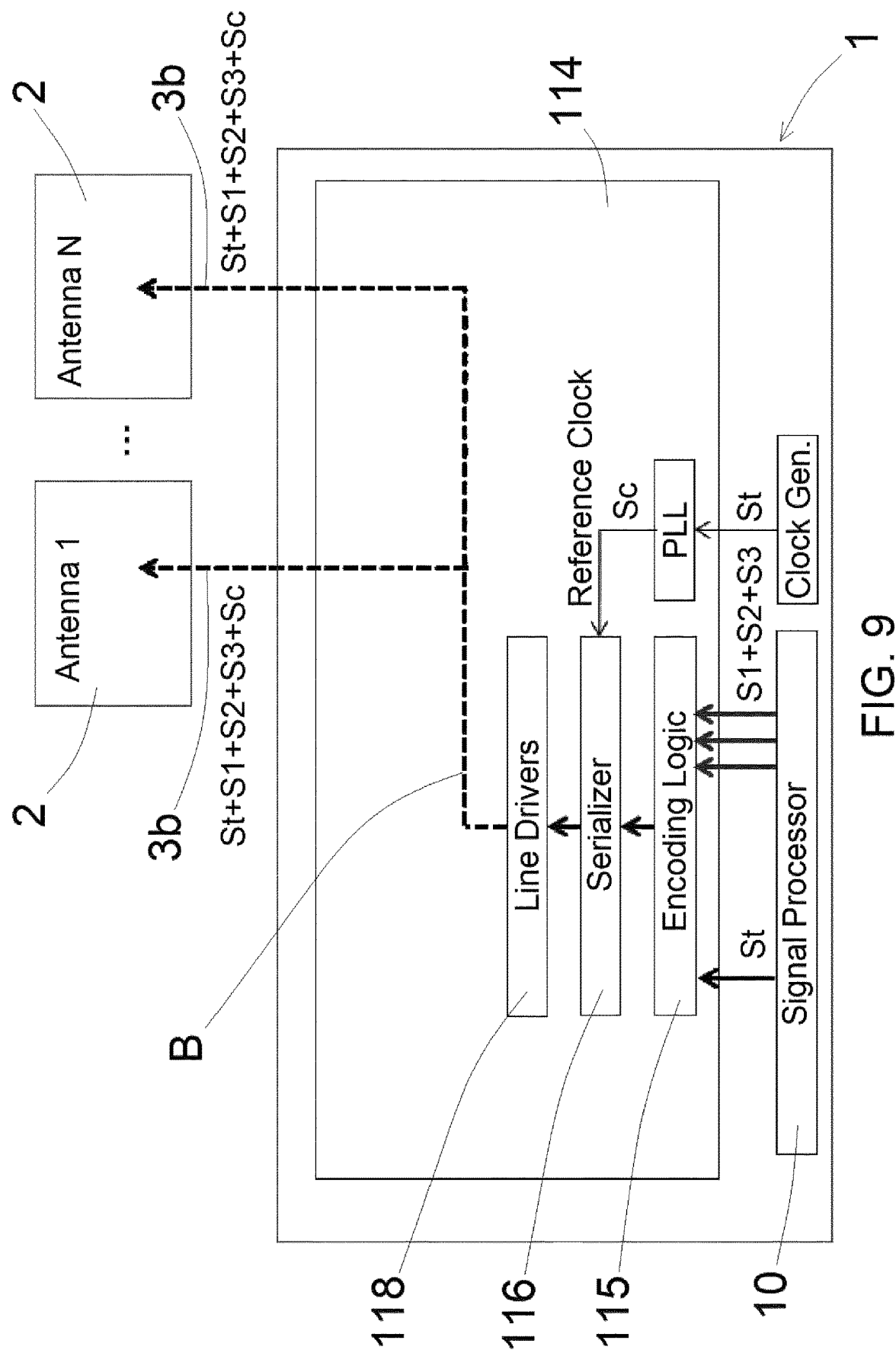
FIGS. 9 and 10 are two block diagrams, illustrating two possible connection configurations of remote antennas to the central unit in the case of digital transmission.

With reference to FIG. 9, all the remote antenna modules (2) receive the signals (St, S1, S2, S3, Sc) via respective digital cables (3b) connected to a single shared data bus (B) that comes out of the line drivers (118) of the control device (114) of the central control unit. Similarly, all the remote antenna modules (2) transmit the input data signal (S0) and any control signals via the respective digital cables (3b) on the shared data bus (B).

In such a case, the various signals traveling on the shared data bus (B) have an addressing (shared band). Hence, the identification of the correct sender/receiver is performed by means of transmission protocol headers inserted by respective control devices (114, 124) which encapsulate the signals to be sent on the shared data bus (B).

Figure 10:
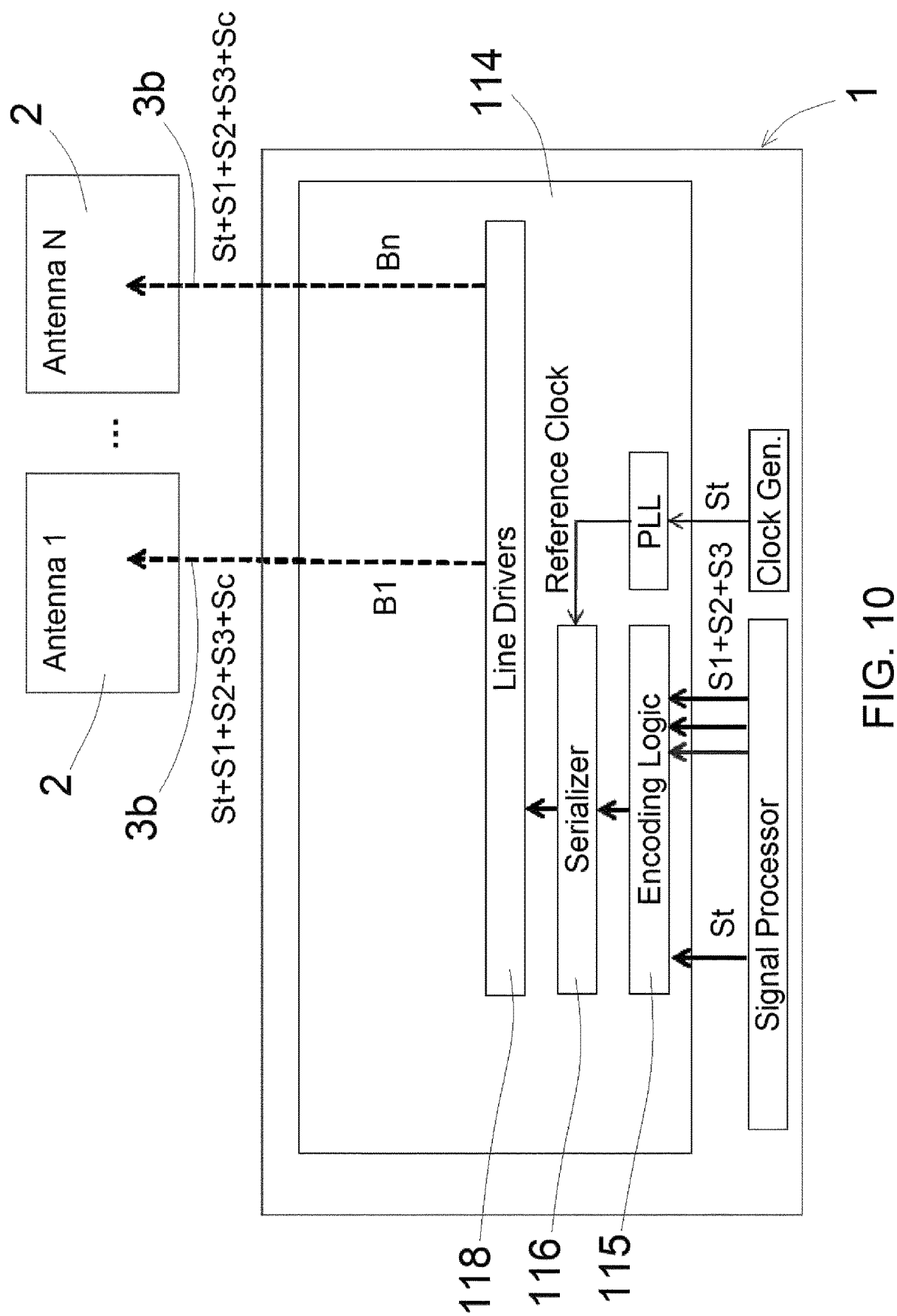

With reference to FIG. 10, all the remote antenna modules (2) receive/transmit signals via respective digital cables (3b) connected to respective dedicated data buses (B1, . . . Bn) coming out of the line drivers (118) of the control device (114) of the central control unit.

In such a case, each remote antenna module (2) has its own dedicated data bus (dedicated bandwidth). Therefore, there is no ambiguity between the transmitter and the receiver and the bandwidth limitations due to the digital communication protocol for very high speed data signals are avoided.

By means of CST and HFSS, the applicant has carried out simulations of the antenna systems (100; 300) in a laboratory and integrated on vehicle parts in order to assess their performance. The beamforming performances of the RF front end (21) have been measured and characterized by means of ICs dedicated for this purpose, and the RF front end (21) has been controlled by means of an especially programmed FPGA.

The simulations have shown that a beamforming of the radiant elements of a module is necessary and that such a beamforming can be controlled by a control signal (S2) coming from the central control unit (1).

The invention claimed is:

1. An antenna system for radio mobile communications in a vehicle, the antenna system comprising;
    at least one remote antenna module connected by a cable to a central control unit, said at least one remote antenna module comprising:
        at least one radiant element adapted to receive and transmit an input data signal or an output data signal;
        an RF front end adapted to amplify and to dephase and to route the input data signal or the output data signal;
        a control interface connected to said RF front end and to the cable, wherein the central control unit comprises:
        a signal processor; and
        a control interface connected to said signal processor and to the cable, wherein said control interface of said at least one remote antenna module and said control interface of the central control unit transmit the input data signal or output data signal at a first intermediate frequency and a control signal at a second intermediate frequency over the cable so as to control said control interface of said at least one remote antenna module, wherein said at least one remote antenna module has a plurality of radiant elements with a variable beam that are configured to receive or transmit signals at millimeter waves of greater than 20 GHz, said RF front end being configured to receive the control signal from the central control unit and to execute a beamforming of the plurality of radiant elements of a single remote antenna module of said at least one remote antenna module, wherein said control interface of said at least one remote antenna module is a part of the at least one remote antenna module, the control interface comprising:
            a frequency converter that receives the input data signal at millimeter waves and converts the input data signal at the first intermediate frequency, the first intermediate frequency being less than a frequency of the millimeter waves so as to be transmitted over the cable, wherein said frequency converter receives the output data signal at a frequency less than a frequency of the millimeter waves, said frequency converter converting the output data signal into millimeter waves so as to be transmitted to a radiant element of the plurality of radiant elements; and
            a control device configured to receive the control signals from a control device of the central control unit, wherein the control signals are different than either the input data signals or the output data signals, the control signals being transmitted on the cable at the second intermediate frequency, the second intermediate frequency being different than the first intermediate frequency of the input data signals and the output data signals, wherein the cable is a coaxial cable that simultaneously transmits the input data signals and the output data signals and the control signals and a power supply signal.

2. The antenna system of claim 1, wherein the plurality of radiant elements comprises an array of radiant elements.

3. The antenna system of claim 1, wherein said control interface of said central control unit is a digital-to-analog/analog-to-digital converter unit, the digital-to-analog/analog-to-digital converter unit comprising:
an analog-to-digital converter that converts the input data signal at the first intermediate frequency from the frequency converter from an analog signal to a digital signal, the digital signal traveling over said coaxial cable; and
a digital-to-analog converter that converts the output data signal from said signal processor from a digital signal to an analog signal so as to be transmitted over the coaxial cable to said frequency converter.

4. The antenna system of claim 1, wherein said control device of said central control unit is a UP frequency converter that converts the control signals from said signal processor to the second intermediate frequency, wherein said control of said at least one remote antenna module is a DOWN frequency converter that converts the control signals from said control device of said central control unit into control signals at a frequency that controls said frequency converter and said RF front end.

5. The antenna system of claim 1, wherein said central control unit has a power supply block connected to the coaxial cable to a power supply block of said at least one remote antenna module, the power supply block of said at least one remote antenna module supplying power to active components of said at least one remote antenna module.

6. The antenna system of claim 5, wherein the power supply block of said at least one remote antenna module is connected to the control device of said at least one remote antenna module so as to send a diagnosis signal indicative of a status of the power supply block of said at least one remote antenna module, the control device of said at least one remote antenna module having a UP frequency converter that converts the diagnosis signal from the power supply block of said at least one remote antenna module into a diagnosis signal at the second intermediate frequency for transmission over the coaxial cable, wherein the control device of said central control unit has a DOWN frequency converter that converts the diagnosis signal from the second intermediate frequency into a select frequency for transmission to said signal processor.

7. An antenna system for radio mobile communications in a vehicle, the antenna system comprising;
at least one remote antenna module connected by a cable to a central control unit, said at least one remote antenna module comprising:
at least one radiant element adapted to receive and transmit an input data signal or an output data signal;
an RF front end adapted to amplify and to dephase and to route the input data signal or the output data signal;
a control interface connected to said RF front end and to the cable, wherein the central control unit comprises:
a signal processor; and
a control interface connected to said signal processor and to the cable, wherein said control interface of said at least one remote antenna module and said control interface of the central control unit transmit the input data signal or output data signal over the cable so as to control said control interface of said at least one remote antenna module, wherein said at least one remote antenna module has a plurality of radiant elements with a variable beam that are configured to receive or transmit signals at millimeter waves of greater than 20 GHz, said RF front end being configured to receive the control signal from the central control unit and to execute a beamforming of the plurality of radiant elements of a single remote antenna module of said at least one remote antenna module, wherein said control interface of said at least one remote antenna module is a part of the at least one remote antenna module, wherein the cable is a digital cable, the control interface of said central control unit having a control device that encapsulates the output data signals with the control signals in order to obtain an encapsulating signal transmitted to the digital cable, wherein the control interface of said at least one remote antenna module comprises:
a frequency converter that receives the input data signal at millimeter waves and converts the input data signal at a first intermediate frequency that is less than a frequency of the millimeter waves for transmission over the cable, said frequency converter receiving the output data signal at a frequency less than the frequency of the millimeter waves so as to convert the output data signal at millimeter waves for transmission to a radiant element of the plurality of radiant elements; and
a control device adapted to decapsulate the encapsulating signal from the digital cable.

8. The antenna system of claim 7, wherein said control interface of said at least one remote antenna module is digital-to-analog/analog-to-digital converter unit connected to said frequency converter and to said control device, said digital-to-analog/analog-to-digital converter unit comprising:
an analog-to-digital converter that converts the input data signal at the first intermediate frequency from said frequency converter into a digital signal; and
a digital-to-analog converter that converts the output data signal from said control device of said at least one remote antenna module into an analog signal.

9. The antenna system of claim 8, wherein said control device of said at least one remote antenna module is configured to encapsulate the input data signal with the diagnosis signal from said control device so as to obtain in a first encapsulated signal for transmission over the digital cable, said control device of said central control unit configured to decapsulate the first encapsulated signal so as to obtain the input data signal and the diagnosis signal, wherein said control device of said central control unit is configured to encapsulate the output data signal with the control signals from said signal processor so as to obtain a second encapsulated signal for transmission over the digital cable, wherein said control device of said at least one remote antenna module is configured to decapsulate the second encapsulated signal so as to obtain the output data signal and the control signals so as to control said frequency converter and said RF front end and said digital-to-analog/analog-to-digital converter unit.

10. The antenna system of claim 7, wherein said control device of said central control unit has a coding/decoding logic and serializer/deserializer and a clock recover/phase lock loop and a plurality of line drivers, wherein said central control unit has a clock generator connected to a PLL such that the PLL generates a clock signal that is transmitted to the serializer, wherein said control device of said at least one remote antenna module has a plurality of line drivers and a deserializer/serializer and a clock recovery/PLL device and a decoding/coding logic.

* * * * *